United States Patent [19]

LeFebvre et al.

[11] Patent Number: 5,798,182
[45] Date of Patent: Aug. 25, 1998

[54] WEAR RESISTANT THIN FILM COATING AND COMBINATION

[75] Inventors: Paul M. LeFebvre; Timothy C. Engel, both of Santa Rosa; Leonard P. Mott, Palo Alto, all of Calif.

[73] Assignee: Optical Coating Laboratory, Inc., Santa Rosa, Calif.

[21] Appl. No.: 680,727

[22] Filed: Jul. 12, 1996

Related U.S. Application Data

[63] Continuation of Ser. No. 149,505, Nov. 8, 1993, abandoned.

[51] Int. Cl.[6] ............................................. B32B 17/00
[52] U.S. Cl. ..................... 428/428; 428/432; 428/446; 428/698; 428/701; 428/702; 428/908.8
[58] Field of Search ............................. 428/689, 698, 428/699, 701, 702, 704, 908.8, 432, 428, 446; 355/230, 231

[56] References Cited

U.S. PATENT DOCUMENTS

| | | |
|---|---|---|
| 4,556,599 | 12/1985 | Sato ........................................ 428/432 |
| 4,628,005 | 12/1986 | Ito ........................................... 428/432 |
| 5,071,693 | 12/1991 | Sue .......................................... 428/698 |
| 5,085,926 | 2/1992 | Iida ......................................... 428/698 |
| 5,091,244 | 2/1992 | Biornard ................................. 428/698 |

*Primary Examiner*—Timothy M. Speer
*Attorney, Agent, or Firm*—Workman, Nydegger & Seeley

[57] ABSTRACT

A wear resistant, low reflectence optical thin films composite is suitable for high wear, stringent optical quality applications such as in xerographic copier platens. The optical thin film coating composite comprises relatively thick layers of aluminum oxide and silicon oxide and a relatively thin top layer of titanium nitride.

4 Claims, 3 Drawing Sheets

WEAR RESISTANT THIN FILM COATING AND COMBINATION

This is a continuation of application Ser. No. 08/149,505, filed 11/08/93 now abandoned.

BACKGROUND OF THE INVENTION

1. Field of the Invention

The present invention relates to wear resistant optical thin film coatings and in particular to thin film protective coatings for wear surfaces such as copier platens.

2. Current State of the Relevant Technology

In xerographic copying, a paper or other article containing images which are to be reproduced, is manually positioned on a transparent platen at a selected copying position and is supported there by the platen for illumination and copying. Alternatively, the paper is transported by the copy machine along the platen to the selected support position. Typically the copier platen is glass. The transport and copying operations are characterized by several conflicting requirements, including low reflectance; low feed-jamming propensity, for example, due to static charge build-up; and adequate abrasion resistance and associated durability. It is desirable that the platen surface have highly durable, wear resistant characteristics to permit a long working life before the thin film coatings on the platen are degraded and before the onset of associated "ghost imaging" or other manifestations of degradation.

FIG. 1 depicts a state-of-the art thin film coated copier platen composite 10 which is available from the assignee, Optical Coating Laboratory, Inc. of Santa Rosa, Calif. The composite 10 comprises a glass copier platen 12 and a protective thin film coating 14 formed on the platen by evaporation. The thin film coating comprises an inner coating 16 of magnesium fluoride, $MgF_2$, and an outer/top coating 18 of indium tin oxide, ITO. In a preferred structure, the $MgF_2$ coating is about 800 Angstroms thick and the ITO is about 50 Angstroms thick. The $MgF_2$ coating serves to decrease the reflectance at the top interface from about 4.5% to about 1.5%. The ITO coating eliminates static charge build-up which can cause paper jamming during copier operation. Although this film structure provides adequate low reflectance and static charge control, like all things created by humans, it is susceptible of improvement. In this case, it is desirable to increase the abrasion resistance and the associated working life of the copier platen. In short, it is desirable to have available a protective thin film structure which provides an even better combination of low reflectance, static charge control and associated low feed-jamming, and improved durability and associated reduced susceptibility to ghost imaging and other manifestations of optical degradation.

SUMMARY OF THE INVENTION

In one aspect the present invention is embodied in an abrasion resistant, low reflectance, optically transmissive thin film composite formed on a substrate, and comprising relatively thick layers of aluminum oxide formed over the platen and silicon oxide formed over the aluminum oxide; and a relatively thin layer of titanium nitride formed over the silicon oxide.

In a more specific aspect, the present invention is embodied in a wear resistant platen combination, comprising a glass platen; and a wear resistant optical thin film coating formed on the platen comprising: a relatively thick layer of aluminum oxide formed over the platen; a relatively thick layer of silicon dioxide formed over the aluminum oxide; and a relatively thin layer of titanium nitride formed over the silicon oxide.

In a presently preferred embodiment, the thicknesses of the aluminum oxide, silicon oxide and titanium nitride layers are respectively about 750 Angstroms, 840 Angstroms and 50 Angstroms.

BRIEF DESCRIPTION OF THE DRAWINGS

The present invention is described in and with reference to the included drawings. Specifically.

DESCRIPTION OF THE PREFERRED EMBODIMENTS

Figure 1:
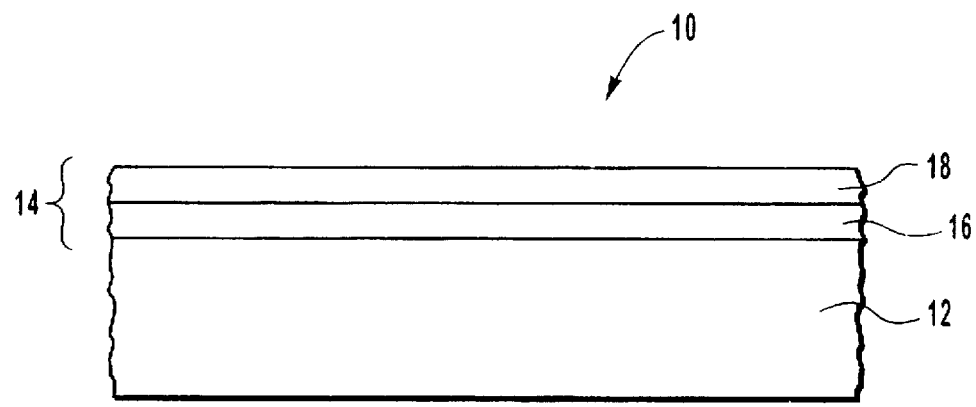
FIG. 1 is a schematic vertical cross-section of a prior art low reflectance coating formed on a copier platen.
Figure 2:
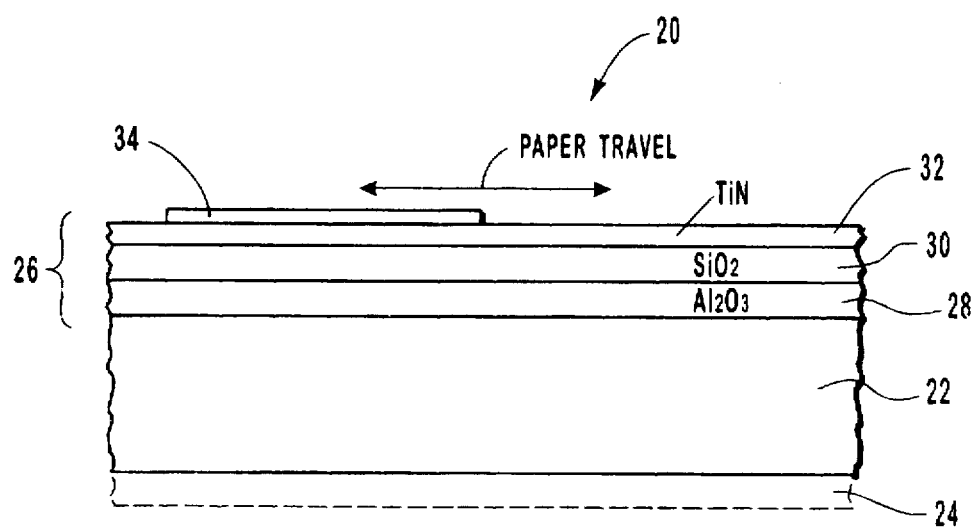
FIG. 2 is a schematic vertical cross-section, not to scale, of a composite embodying the present invention, comprising a low reflectance thin film coating formed on a copier platen.

FIG. 2 depicts a preferred embodiment 20 of a wear resistant composite according to the present invention having characteristics, including wear resistance, lubricity and low reflectance, which make it suitable for applications such as copier platens. The composite or combination includes a substrate 22, illustratively the glass platen of a copier machine. Optionally (and preferably for copier use), an anti-reflection coating 24 is formed on the major surface of the substrate facing the copier optics (not shown) and the thin film coating composite 26 according to the present invention is formed on the opposite major surface, that is, on the surface on which the paper 34 which is to be "copied" travels and is positioned.

The wear resistant, low reflection coating 26 comprises in order from the substrate, a relatively thick layer 28 of aluminum oxide formed on the substrate/platen 22; a relatively thick layer 30 of silicon oxide formed on the aluminum oxide; and a relatively thin layer 32 of titanium nitride formed on the silicon oxide. The three materials are wear resistant. Preferably they are formed by sputtering, or by other processes which provide structural integrity and highly dense coating of the materials. The aluminum oxide increases the abrasion resistance of the platen. The silicon oxide decreases the reflectance and increases durability. Although the wear resistance properties of titanium nitride are known, its application has been in the tool industry, where thick, opaque coatings provide enhanced abrasion resistance for stainless steel tool bits and other high-wear components. Titanium nitride is characterized by a gold color. However, surprisingly, when applied in very thin coatings of a few angstroms thickness, the titanium nitride material imparts excellent abrasion resistance to the composite 20 and does not degrade visible transmission. In addition, the material is conductive, thereby providing a static bleed layer, and has the characteristic of lubricity, lowering the surface friction associated with the composite. In short, the combination of aluminum oxide, silicon oxide and titanium nitride provides the desired combination of durability and abrasion resistance and low reflectance, and has the added advantage of lubricity and static bleed characteristics.

In a presently preferred sputtered thin film combination formed on a glass platen/substrate, the aluminum oxide, $Al_2O_3$, is about 750 Angstroms thick; the silicon oxide, $SiO_2$, is about 840 Angstroms thick; and the titanium nitride is formed to a thickness of about 50 Angstroms.

Figure 3:
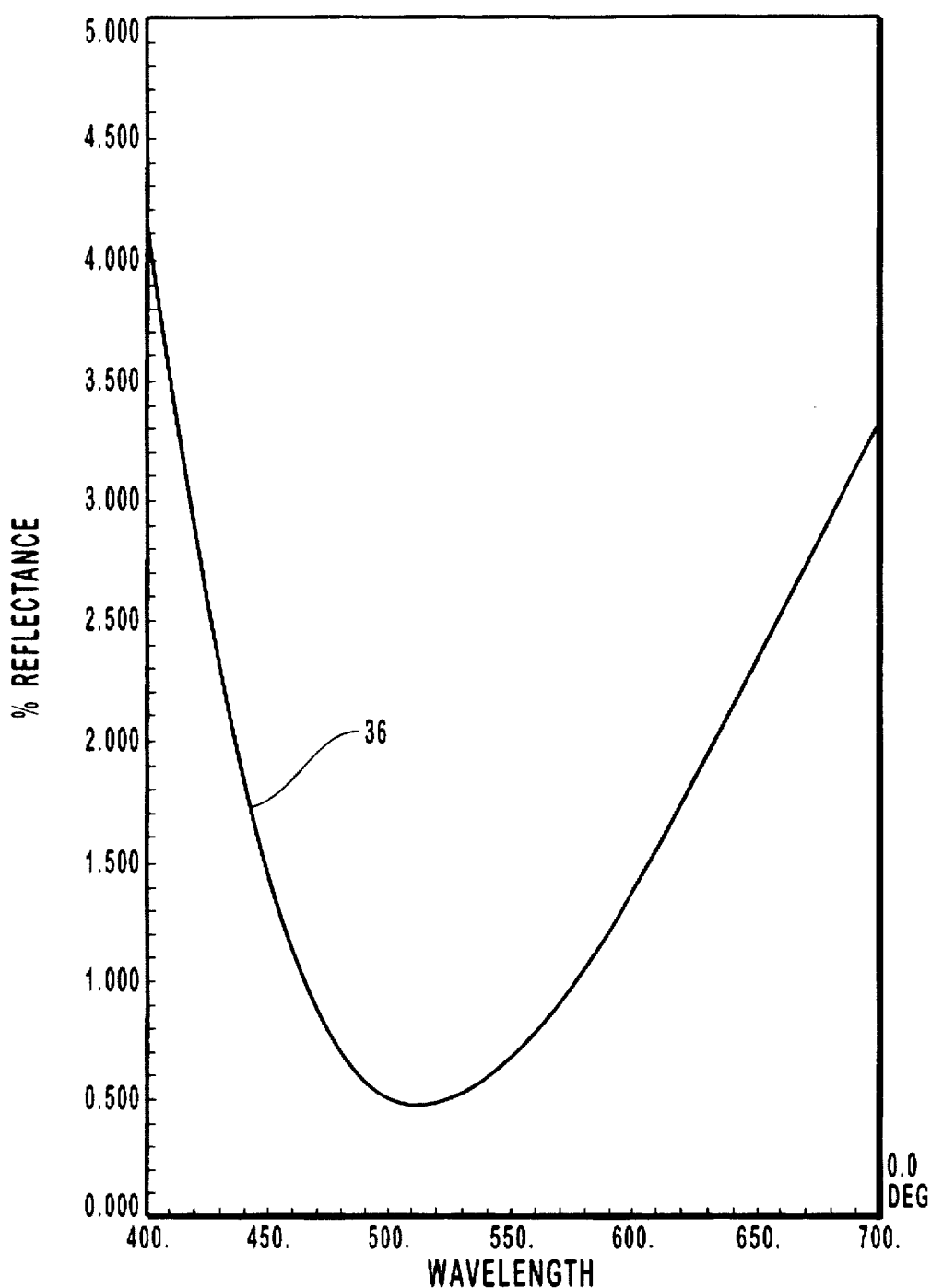
FIG. 3 is a graph of % reflectance for the composite of FIG. 2.
Figure 4:
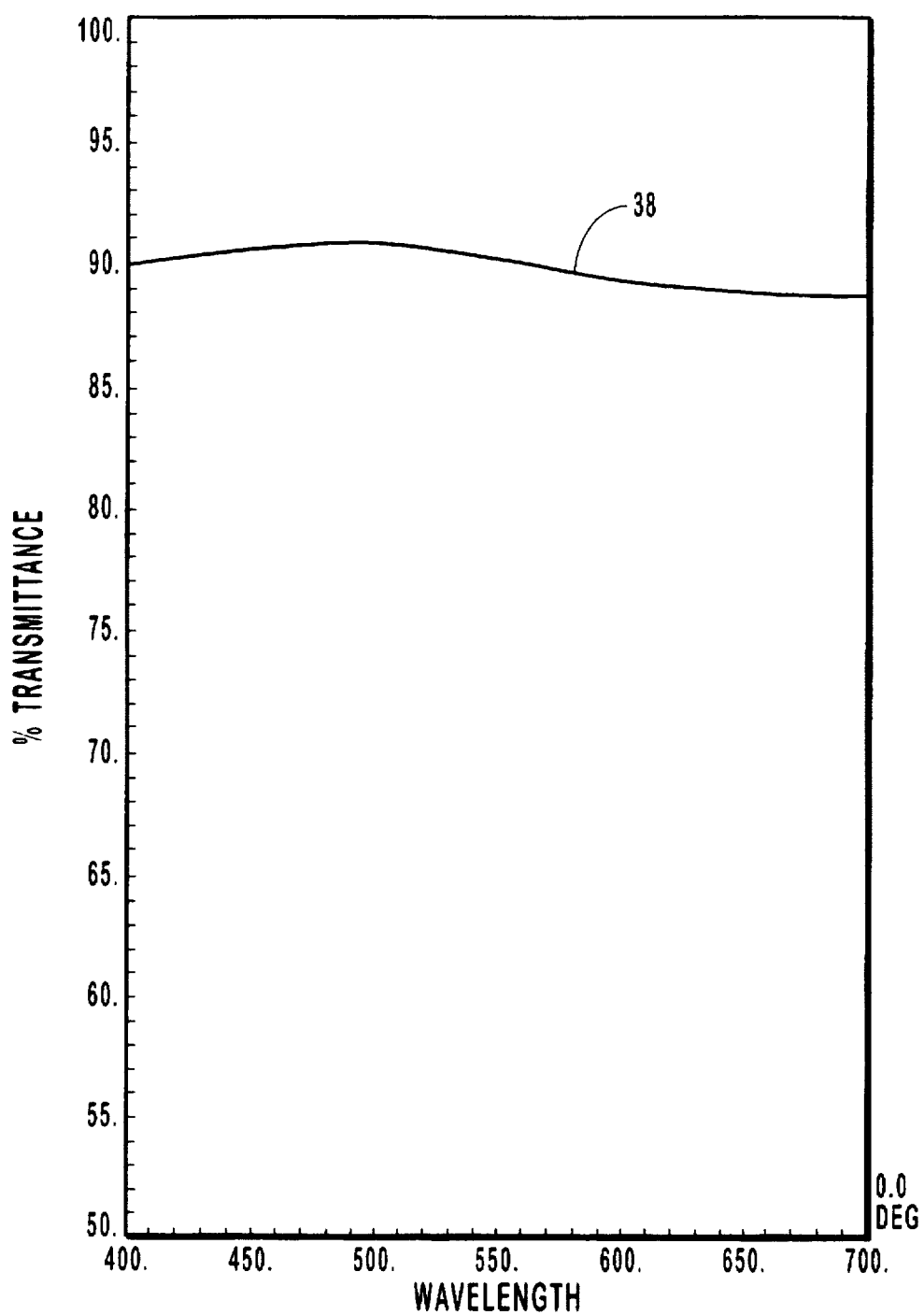
FIG. 4 is a graph of % transmission for the composite of FIG. 2.

FIGS. 3 and 4 characterize the optical performance of the above preferred combination. Specifically, curve 36, FIG. 3, depicts the % reflectance of the preferred combination as a function of wavelength over the range 400 nm (nanometers) to 700 nm. The coating reduces reflectance from about 4.5% to about 0.5%. Effectively, it functions as a wear-resistant anti-reflection coating which diminishes ghost images long term and enhances image quality. The curve 38, FIG. 4, depicts % transmission as a function of wavelength over the range 400 nm to 700 nm. The exhibited transmission is about 90%. Thus, although the coating incorporates titanium nitride, which is optically opaque, the very thin titanium nitride layer provides excellent optical transmission, yet still exhibits the wear resistance and conductive properties which are characteristic of much thicker layers of titanium nitride.

Having thus described preferred and alternative embodiments of the wear resistant, low reflectance optical quality thin film combination of the present invention and the underlying principles for selecting the materials and thickness thereof, those of usual skill in the art will readily develop modifications and embodiments, including other applications in combination with other substrates, which are within the scope of the invention, limited only by the appended claims.

What is claimed is:

1. An abrasion resistant, optically clear, wear resistant, anti-reflection thin film coated copier platen, the thin film comprising in order from the platen: a layer of aluminum oxide formed on the platen; a layer of silicon dioxide formed on the aluminum oxide; and an optically transmissive, abrasion resistance-enhancing, conductive layer of titanium nitride formed on the silicon oxide, the layer of titanium nitride being thin relative to the layers of aluminum oxide and silicon oxide.

2. The coated platen of claim 1, wherein the thicknesses of the aluminum oxide, silicon oxide and titanium nitride coatings are respectively about 750 Angstroms, 840 Angstroms and 50 Angstroms.

3. A wear resistant thin film coated platen, comprising: a glass platen; and a wear resistant, optically clear, anti-reflection thin film coating formed on the platen comprising: a layer of aluminum oxide formed over the platen; a layer of silicon dioxide formed over the aluminum oxide; and an optically transmissive, abrasion resistance-enhancing, conductive layer comprising titanium nitride formed over the silicon oxide, the layer of titanium nitride being thin relative to the layers of aluminum oxide and silicon oxide.

4. The thin film coated platen of claim 3, wherein the thickness of the aluminum oxide, silicon oxide and titanium nitride coatings is respectively about 750 Angstroms, 840 Angstroms and 50 Angstroms.

\* \* \* \* \*